United States Patent
Spink et al.

(10) Patent No.: US 7,643,477 B2
(45) Date of Patent: Jan. 5, 2010

(54) BUFFERING DATA PACKETS ACCORDING TO MULTIPLE FLOW CONTROL SCHEMES

(75) Inventors: Aaron T. Spink, San Francisco, CA (US); Herbert H. J. Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 11/211,046

(22) Filed: Aug. 24, 2005

(65) Prior Publication Data

US 2007/0053350 A1    Mar. 8, 2007

(51) Int. Cl.
*H04Q 11/00* (2006.01)
(52) U.S. Cl. .................. 370/381; 370/363; 370/368
(58) Field of Classification Search .......... 370/431, 370/433, 381, 363, 368
See application file for complete search history.

(56) References Cited

U.S. PATENT DOCUMENTS

| | | | | |
|---|---|---|---|---|
| 5,583,990 A * | 12/1996 | Birrittella et al. | ........ | 712/29 |
| 5,701,416 A * | 12/1997 | Thorson et al. | ........ | 712/11 |
| 5,737,535 A * | 4/1998 | Bagley et al. | ........ | 709/227 |
| 5,838,994 A * | 11/1998 | Valizadeh | ........ | 710/56 |
| 6,009,488 A | 12/1999 | Kavipurapu | ........ | 710/105 |
| 6,460,080 B1 | 10/2002 | Shah et al. | ........ | 709/244 |
| 6,628,615 B1 * | 9/2003 | Joseph et al. | ........ | 370/231 |
| 6,683,884 B1 | 1/2004 | Howard | ........ | 370/412 |
| 7,219,220 B2 * | 5/2007 | Cherukuri et al. | ........ | 713/2 |
| 2005/0088967 A1 | 4/2005 | Cen | ........ | 370/228 |
| 2005/0251599 A1 | 11/2005 | Hum et al. | ........ | 710/100 |
| 2005/0251611 A1 | 11/2005 | Creta et al. | ........ | 710/316 |
| 2005/0251612 A1 | 11/2005 | Creta et al. | ........ | 710/316 |
| 2006/0092837 A1 * | 5/2006 | Kwan et al. | ........ | 370/229 |

OTHER PUBLICATIONS

"PCI Express and Advanced Switching: Evolutionary Path to Building Next Generation Interconnects". David Maythew and Krishnan. Proceedings of the 11$^{th}$ Symposium on High Performance Interconnects, Aug. 20-22, 2003.
U.S. Appl. No. 11/211,063, filed Aug. 24, 2005, entitled "Interleaving Data Packets in a Packet-Based Communciation System" by Aaron T. Spink and Herbert H.J. Hum.

* cited by examiner

*Primary Examiner*—Dang T Ton
*Assistant Examiner*—Frederick Ott
(74) *Attorney, Agent, or Firm*—Trop, Pruner & Hu, P.C.

(57) ABSTRACT

In one embodiment, the present invention includes an apparatus that has multiple buffers, including a first buffer dedicated to a first virtual channel of a first virtual network and a second buffer shared among virtual channels of a second virtual network. The shared buffer may be implemented as a shared adaptive buffer, and the buffers can be controlled using different flow control schemes, such as on a packet and flit basis. Other embodiments are described and claimed.

19 Claims, 5 Drawing Sheets

BUFFERING DATA PACKETS ACCORDING TO MULTIPLE FLOW CONTROL SCHEMES

BACKGROUND

Embodiments of the present invention relate to data communication, and more particularly to packet-based communication.

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices are coupled to the same bus. Accordingly, it is easy to read or write to devices on the same bus.

However, as bus interface speeds increase, bus architectures are moving away from multi-drop architectures towards point-to-point architectures. In point-to-point architectures, peer-to-peer communication becomes more difficult as synchronization, ordering, and coherency of such communications becomes more difficult. One example of a point-to-point architecture is a PCI Express™ architecture in accordance with the PCI Express Base Specification, Rev. 1.0 (published Jul. 22, 2002).

Communication between serially connected devices typically involves buffering data to be sent in a transmitting device and then sending the data in a packetized form to a receiving device. Various flow control schemes exist to control the transfer of data between the devices. However, common schemes consume significant resources and can lead to inefficiencies in data transmission as well as consumption of buffer resources, communication delays and the like. Accordingly, a need exists for improved flow control between devices.

DETAILED DESCRIPTION

Figure 1:
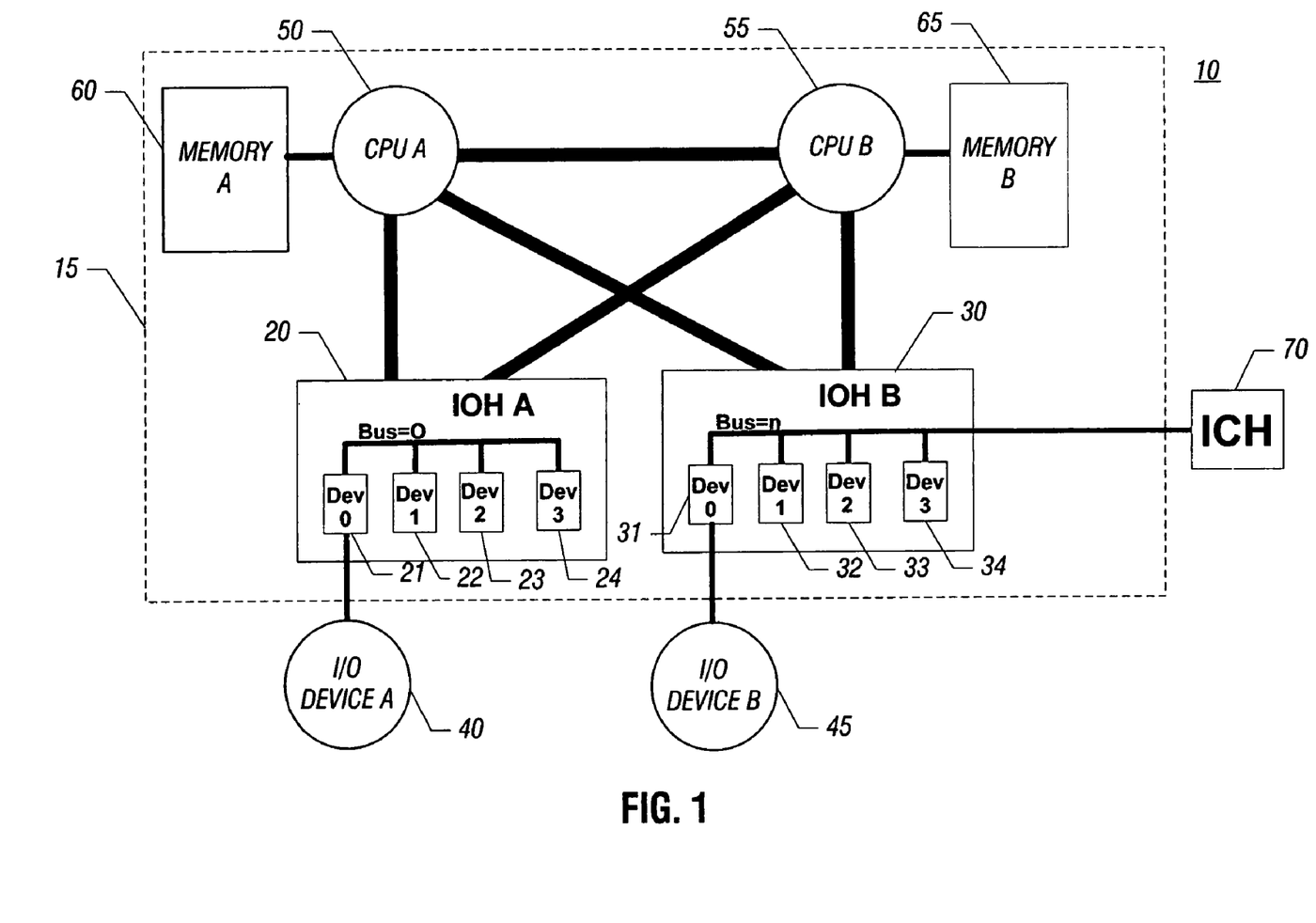
FIG. 1 is a block diagram of a system in accordance with one embodiment of the present invention.

Referring to FIG. 1, shown is a block diagram of a system in accordance with one embodiment of the present invention. As shown in FIG. 1, system 10 may be a multiprocessor system including a coherent interface in accordance with an embodiment of the present invention. That is, system 10 may represent any one of a desired desktop, mobile, server or other such platform, in different embodiments. In certain embodiments, interconnections between different components of FIG. 1 may be point-to-point interconnects that provide for coherent shared memory within system 10, and in one such embodiment the interconnects and protocols used to communicate therebetween may form a coherent system. In such manner, multiple processors, memories, and other components of system 10 may coherently interface with each other.

Referring to FIG. 1, system 10 may include a first processor 50 (CPU A) and a second processor 55 (CPU B). In various embodiments, each processor may include memory controller functionality such that the processors may directly interface with an associated shared memory via a point-to-point interconnect. For example, as shown in FIG. 1, processor 50 may be coupled to a memory 60 (memory A) via a point-to-point interconnect and processor 55 may be coupled to a memory 65 (memory B) via a similar point-to-point interconnect. More so, processors 50 and 55 may be coupled to each other via a point-to-point interconnect. Similarly, each of processors 50 and 55 may be coupled via point-to-point interconnects to each of a first input/output (I/O) hub (IOH A) 20 and a second IOH 30 (IOH B).

In the embodiment of FIG. 1, all components within box 15 may collectively form a coherent system (i.e., coherent system 15). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 60 and 65 may be reserved for non-coherent transactions. While the embodiment of FIG. 1 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 1, I/O hubs 20 and 30 may each include a plurality of ports (e.g., ports 21-24 in IOH 20 and ports 31-34 in IOH 30) to interface with I/o devices coupled thereto. For example, in certain embodiments, such I/O devices may be devices in accordance with one or more bus schemes. In one embodiment, such I/O devices may be PCI Express™ devices. For simplicity, FIG. 1 shows a single I/O device coupled to each I/O hub, namely I/O device (I/O device A) 40 coupled via port 21 to IOH 20 and I/O device (I/O device B) 45 coupled via port 31 to IOH 30. It is to be understood that the number of ports in an I/O hub in accordance with an embodiment of the present invention may vary, and the number of ports and devices coupled thereto shown in FIG. 1 are for illustrative purposes only.

Also shown in FIG. 1 is a legacy I/O controller hub (ICH) 70 coupled to IOH 30. In one embodiment, ICH 70 may be used to couple legacy devices such as a keyboard, mouse, and Universal Serial Bus (USB) devices (e.g., devices in accordance with the USB Specification Rev. 2.0 (published December 2000)) to coherent system 15.

While the I/O hubs shown in FIG. 1 include a plurality of ports, it is to be understood that the hubs may realize various functions using a combination of hardware, firmware and software. Such hardware, firmware, and software may be used so that the I/O hub may act as an interface between coherent system 15 (e.g., shared memories 60 and 65, processors 50 and 55, and IOHs 20 and 30), and devices coupled thereto such as I/O devices 40 and 45. In addition, the I/O hubs of FIG. 1 may be used to support various bus or other communication protocols of devices coupled thereto. IOH 20 and IOH 30 may act as agents to provide a central connection between two or more communication links. In particular, IOH 20 and IOH 30 may be referred to as "agents" that provide a connection between different I/O devices coupled to coherent system 15. In various embodiments, other components within coherent system 15 may also act as agents.

In various embodiments, each port of I/O hubs 20 and 30 may include a plurality of channels, often referred to herein as "virtual channels" that together may form one or more virtual networks and associated buffers to communicate data, control and status information between various devices. In one particular embodiment, each port may include up to at least six such channels, including a home (HOM) channel, a snoop (SNP) channel, a response (NDR) channel, a short message (NCS) channel, a data (NCB) channel and a data response (DR) channel, although the scope of the present invention is not so limited.

In other embodiments, additional or different virtual channels may be present in a desired protocol. Further, while discussed herein as being used within a coherent system, it is to be understood that other embodiments may be implemented in a non-coherent system to provide for deadlock-free routing of transactions. In some embodiments, the channels may keep traffic separated through various layers of the system, including, for example, physical, link, and routing layers, such that there are no dependencies.

In various embodiments, flow control for the different virtual channels may be maintained separately to avoid interdependencies between traffic flowing between the different channels. Thus there is no ordering within each of the virtual channels. Further, transactions of peer devices (which order transactions) coupled to a coherent system flow through the virtual channels in an unordered fashion. In various embodiments, a credit-based flow control mechanism may be implemented such that the separate channels have separate credit pools. However, in other embodiments other flow control mechanisms, such as a retry mechanism or another type of flow control may be realized. Different types of transactions may be routed though different virtual channels in accordance with an embodiment of the present invention to avoid deadlocks. Such transactions may include, for example, read and write transactions, data messages and the like.

Figure 2:
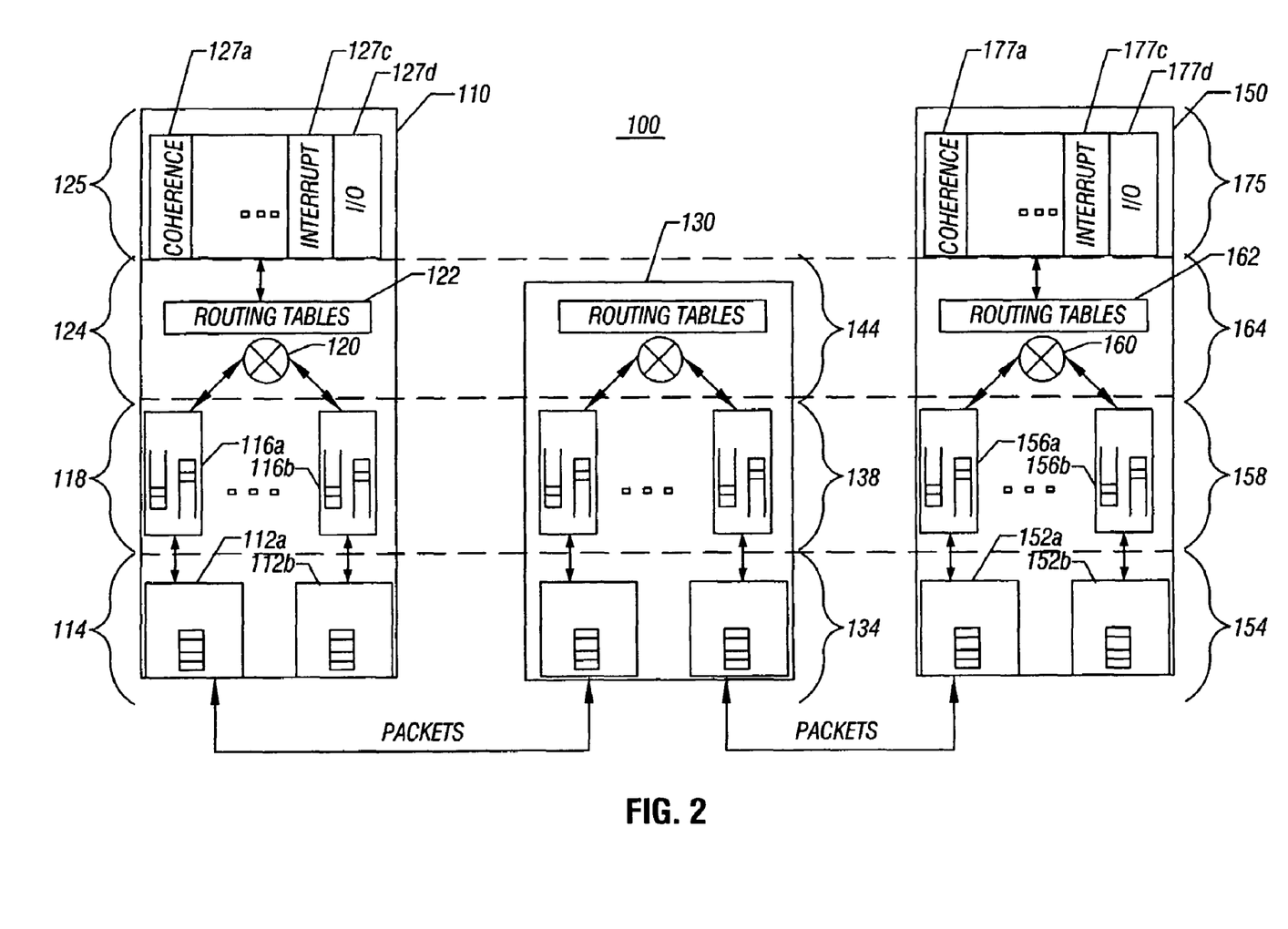
FIG. 2 is a block diagram of a portion of a coherent system in accordance with one embodiment of the present invention.

Referring now to FIG. 2, shown is a block diagram of a portion of a coherent system in accordance with one embodiment of the present invention. As shown in FIG. 2, system 100 includes a first agent 110, a second agent 150, and a bridging agent 130. In one embodiment, agents 110 and 150 may be I/O hubs, while bridging agent 130 may be a switching device. In other embodiments, the agents may be microprocessors, other bus agents and the like. Also while discussed in the embodiment of FIG. 2 as a coherent system, it is to be understood that the scope of the present invention is not so limited.

First agent 110 may include a plurality of layers, including a physical layer 114, a link layer 118, a routing layer 124 and a protocol layer 125. Packets may be received in first agent 110 at physical layer 114, which may include a plurality of electrical transfer ports 112a and 112b. In various embodiments, physical layer 114 may be used to provide electrical transfer of information between two directly connected coherent agents via a fabric. While shown as including two such ports in the embodiment of FIG. 2, it is to be understood that additional ports may be present in other embodiments.

Packets communicated between agents may include a header and associated information (e.g., a "payload"). The packets are then forwarded to link layer 118, which may include a plurality of buffer flow control mechanisms. Shown in the embodiment of FIG. 2 are two buffer flow control mechanisms 116a and 116b, each of which may include an incoming buffer and an outgoing buffer. While not shown in FIG. 2, flow control mechanisms 116a and 116b may also include various counters and control logic to implement credit-based flow control.

Link layer 118, in various embodiments, may be used to provide reliable data transfer and flow control between two directly connected coherent agents, and also to virtualize a physical channel between the devices. Link layer 118 may be flow controlled to prevent overflow or underflow, and may also provide error detection and recovery. In one embodiment, flow control may be implemented using a flit-based level credit/debit flow control. A flit may refer to a smallest unit of data transfer which, in one embodiment, may be 80 bits long. A packet corresponds to a logical grouping of one or more flits. In certain embodiments, a packet may be the smallest unit of information that includes routing and other information via a header. Each packet may contain a header and an optional data field. In certain embodiments, the header may be one to two flits long, and a data portion may extend to a cacheline size of the coherent system.

In various embodiments, link layer 118 may virtualize a physical channel into multiple message classes and virtual networks. In such manner, a physical channel may be multiplexed among multiple virtual channels. Such message classes may be used to avoid protocol level deadlocks and provide quality of service (QoS) measures. In various embodiments, a plurality of virtual networks may be implemented, each having a plurality of virtual channels. In various embodiments, a group of virtual channels that includes all the message classes may form a virtual network. Each virtual network may include at least six virtual channels as discussed above. However, in other embodiments, each virtual network may include more or fewer virtual channels. For example, a virtual network may include other virtual channels for coherent transactions and isochronous transactions.

As will be described further below, in various embodiments a link layer in accordance with an embodiment of the present invention may operate with multiple flow controls schemes. For example, a portion of the flow control system may operate on a packet basis, while another portion of the flow control system may operate on a flit basis. However, it is to be understood the scope of the present invention is not so limited and in other embodiments different manners of handling flow control may be implemented.

In one embodiment, link layer 118 may be implemented to handle flow control for a first virtual network as a shared adaptive buffer network that shares its buffering resources among the virtual channels of the network. Link layer 118 may also perform flow control for a second virtual network as a non-shared buffer network in which each virtual channel may have dedicated buffering resources, assuring that no deadlock can occur between the virtual channels. In implementations where there are more than two virtual networks present, a combination of at least one shared adaptive buffer network and at least one non-shared buffer network may be implemented.

Thus each virtual network of a link layer may have independent buffering and flow control. In one such embodiment, three virtual networks may be present, including a first virtual network (e.g., VN0), a second virtual network (e.g., VN1), and a third virtual network (e.g., VNA). The first and second virtual networks may provide for flexible routing and deadlock avoidance via dedicated buffer resources. The third virtual network may provide an adaptive buffer pool so that its buffer resources may be shared among multiple channels for efficient implementation. This adaptive buffer pool may minimize buffer space requirements, in many embodiments. Also, in various implementations, dedicated buffers may be sized to handle a largest packet size for its dedicated channel, while all other buffering resources may be consolidated into the adaptive buffer pool.

In certain embodiments, the shared virtual network may support a large number of message classes and may be used in connection with one or more non-shared virtual networks to avoid a deadlock situation. For example, a blocked message (e.g., an unavailable credit) of a given message class may be transitioned to a non-shared virtual network and then back to a shared virtual network at a subsequent link (or vice versa). In one embodiment, non-shared virtual networks may perform flow control on a per message basis, while a shared virtual network may perform flow control on a per flit basis.

When flits are properly received, link layer 118 may provide the flits to routing layer 124. In various embodiments, routing layer 124 may provide a flexible and distributed manner of routing coherent packets from source to destination. The destination-based routing may be determined using routing tables within routing layer 124, which allows for adaptive routing and on-line reconfiguration of the routing tables. In one embodiment, a header generated by a transaction layer may include information that identifies a destination, an input port and a virtual network, and these values may be input into a routing table to determine the desired output port and the virtual network on which the transaction may flow. In various embodiments, routing tables may be stored in protected configuration space and programmed by firmware. Such routing tables may be programmed to enable deadlock-free routing for various topologies. Such destination-based routing may be based on a node identifier (node ID), which uniquely identifies an agent within the coherent system. Thus flits received from link layer 118 may be multiplexed in routing layer 124 through a switch 120 and provided to routing tables 122, which use, for example, a destination node ID field value to route the associated header and payload (if present) to the proper agent. If a packet is destined for agent 110, routing tables 122 will provide the packet to protocol layer 125. Alternately, if the packet is destined for another destination, the header and packet will be sent back through link layer 118 and physical layer 114 of agent 110 to a different agent.

In one embodiment, a protocol layer 125 (also referred to as a "transaction layer") may include various protocol engines to form, order, and process packets for transmission through a coherent system. For example, in one embodiment, transaction layer 125 may include a coherence engine 127a, an interrupt engine 127C, and an I/O engine 127d, among others. Using such engines, transaction layer 125 may form a packet having a common system header (also referred to as a "system interconnect header"). The packets thus formed in transaction layer 125 may be provided to routing layer 124 on a given virtual channel.

In various embodiments of the present invention, protocol layer 125 may use a transaction ID associated with the header to order a transaction and perform desired processing thereon using various engines within protocol layer 125. Shown as representative engines in the embodiment of FIG. 2 are a coherence engine 127a, an interrupt engine 127c, and an I/O engine 127d.

Similar functionality may be present in second agent 150, which includes a corresponding physical layer 154, link layer 158, routing layer 164, and protocol layer 175. As further shown in FIG. 2, each of these layers may include components similar to those of agent 110, including, for example, electrical transfer units 152a and 152b, buffer flow control mechanisms 156a and 156b, switch 160, routing tables 162, and protocol engines 177a, 177c, and 177d.

Further shown in FIG. 2, a bridging agent 130 may include corresponding physical, link, and routing layers (respectively, physical layer 134, link layer 138, and routing layer 144). In certain embodiments, bridging agent 130 may be a switch, bridge, hub, or the like, and may be used to provide a bridge between a different set of agents or nodes of coherent system 100. For example, in another embodiment, bridging agent 130 may be coupled to a first plurality of processors (e.g., on a left hand side) and a second plurality of processors (e.g., on a right hand side).

By using multiple channels to route different transaction types throughout a system, data communications within the system may be completely unordered. However, ordered transactions flowing through the system from a first peer device to a second peer device may be routed through the system in an unordered manner to avoid deadlocks, and be provided to the second peer device with its ordering information remaining intact.

Figure 3:
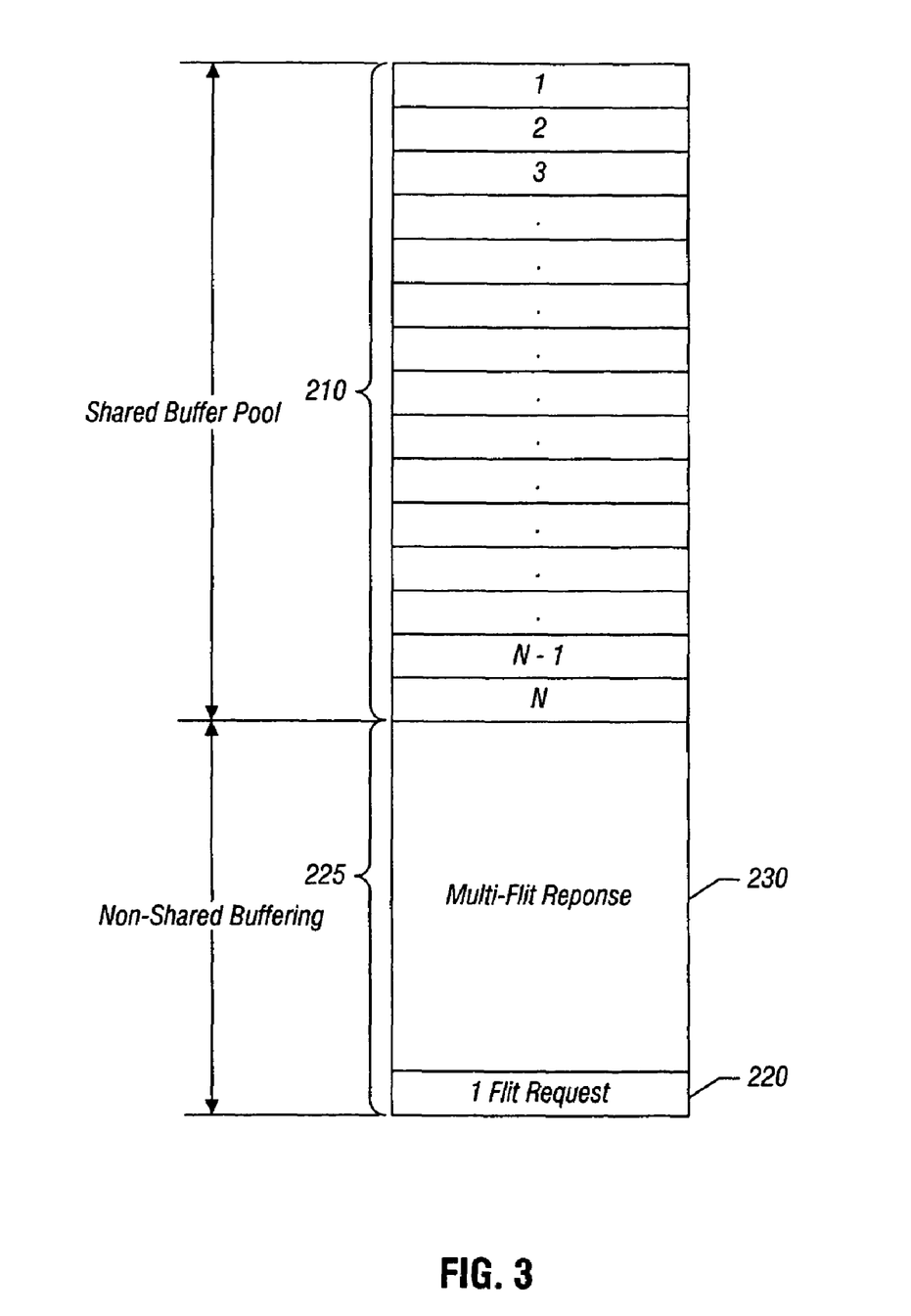
FIG. 3 is a block diagram of a buffer scheme in accordance with one embodiment of the present invention.

Referring now to FIG. 3, shown is a block diagram of a buffer scheme in accordance with one embodiment of the present invention. As shown in FIG. 3, a buffer configuration 200 of a link layer may include shared buffers and non-shared buffers in accordance with an embodiment of the present invention. Specifically, buffer configuration 200 includes a shared buffer pool 210 that includes a plurality of flit-sized blocks (i.e., 1 to N blocks in the embodiment of FIG. 3). Buffer configuration 200 further includes a non-shared buffer pool 225, each buffer of which may be dedicated to a given virtual channel. For ease of illustration, only two such non-shared buffers are shown in the embodiment of FIG. 3. Thus, a multi-flit response buffer 230 and a single flit-sized request buffer 220 are shown corresponding to these two virtual channels. In various embodiments, each virtual network may include two or more virtual channels to handle different message sizes. For example, one virtual channel may carry requests with a size of one flit, while another virtual channel of the same network may carry data responses sized for multiple flits.

In one implementation, buffer 220 may be dedicated to a request virtual channel, such as a data request channel, while response buffer 230 may be dedicated to a response channel, such as a data response channel, although the scope of the present invention is not so limited. In various embodiments, a dedicated buffer may be provided for each virtual channel of a virtual network implementing dedicated buffers. Accordingly, non-shared buffer pool 225 of buffer configuration 200 may be associated with a first virtual network, while shared buffer pool 210 may be associated with a second virtual network.

In various implementations, a credit/debit flow control system may be implemented in which a sender is provided a predetermined number of credits with which to send messages. Such credits may be separated by virtual network, and in the case of a non-shared virtual network, may also be separated by virtual channel. That is, each virtual channel of a non-shared virtual network may have dedicated credits. In various embodiments, the flow control system of the non-shared virtual network may operate on a packet basis. For example, a request message may be sent using a single request credit, while a single response credit may be used to send a response message, regardless of message size. In contrast, in a shared adaptive virtual network, flow control may operate on a flit basis. In such an implementation, a single shared adaptive credit may be used to send a single flit request message, while five shared adaptive credits (for example) may be used to send a five-flit response message. Similarly, credit return may be implemented on a packet basis for the non-shared virtual network, with each virtual channel having dedicated credit returns. In contrast, for a shared adaptive virtual network, credits may be returned on a flit or multi-flit basis and used by all virtual channels within that network. By using both packet and flit credits, the number of credit return messages for a non-shared virtual network may be reduced. Furthermore, one or more shared virtual networks may support a variety of different packet sizes by operating on a flit basis in the credit/debit flow control system.

Figure 4:
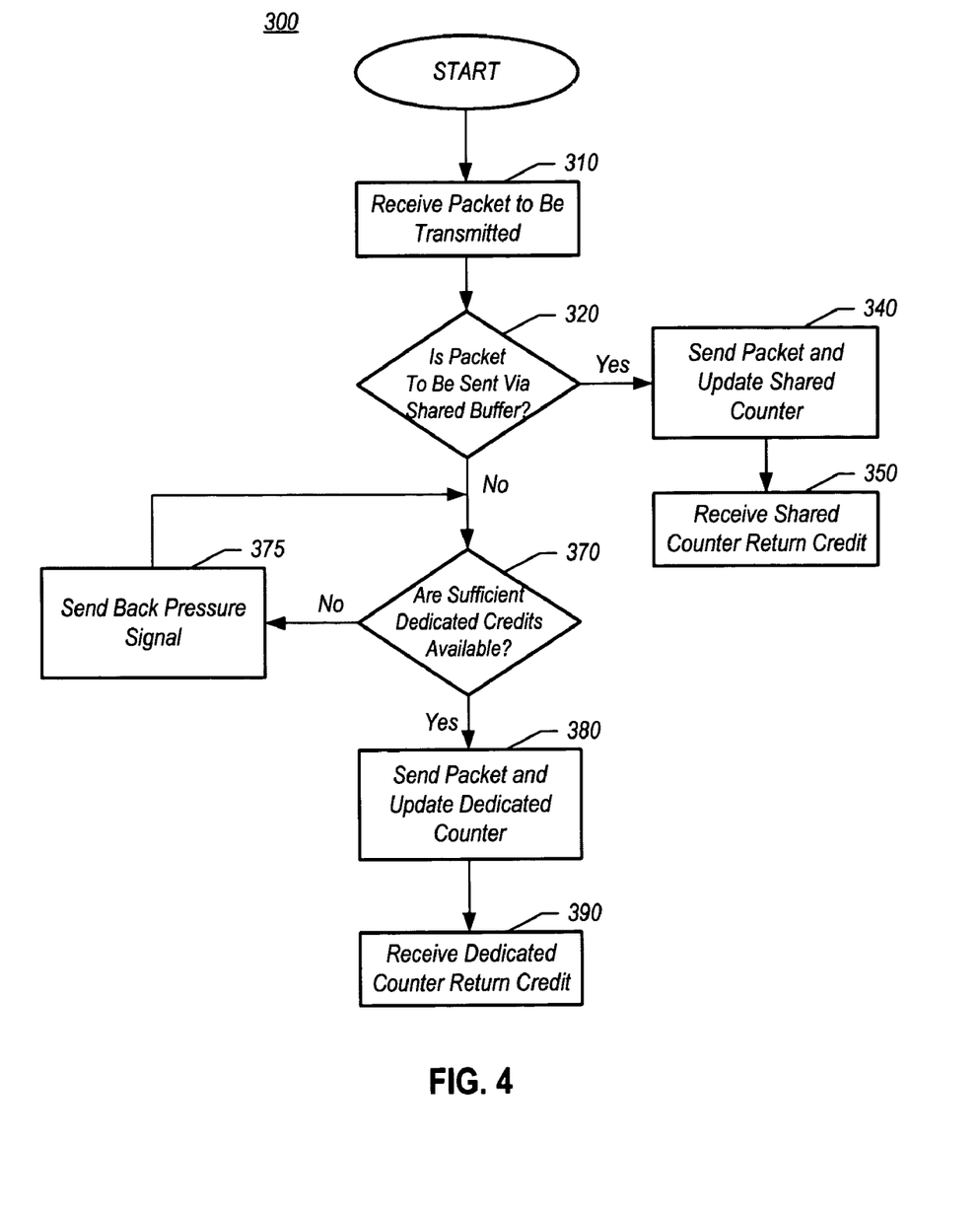
FIG. 4 is a flow diagram of a method in accordance with one embodiment of the present invention.

Referring now to FIG. 4, shown is a flow diagram of a method in accordance with one embodiment of the present invention. As shown in FIG. 4, method 300 may be used to transmit packets according to a flow control system in accordance with an embodiment of the present invention. Method 300 may begin by receiving a packet to be transmitted (block 310). In some embodiments, packets may be received from a protocol layer, although the scope of the present invention is not so limited. Next it may be determined whether the packet is to be sent via a shared buffer (diamond 320). Thus, in some implementations, a link layer may be controlled to use a shared adaptive network (and accordingly a shared adaptive buffer) as a primary communication channel.

Still referring to FIG. 4, implicit in the determination of whether a packet is to be sent via the shared buffer is a determination of whether sufficient shared credits are available. If sufficient shared credits are available, control passes to block 340. There, the packet is sent from the link layer and a shared counter corresponding to the shared buffer may be updated (block 340). For example, the shared counter may be decremented by an amount corresponding to the number of flits of the packet that is sent. In various embodiments, the packet may be sent through a physical layer, for example, and routed to a receiving agent, which processes the packet accordingly. When the packet is successfully received and stored, the receiving agent may send a return message to the sending agent that includes a return credit. Accordingly, the link layer of the sending agent may receive a shared counter return credit (block 350). In various embodiments, this return credit may correspond to the number of flits received by the receiving agent. While not shown in the embodiment of FIG. 4, it is to be understood that the shared counter may be updated in accordance with the credit return received.

Still referring to FIG. 4, if at diamond 320 (discussed above) it is determined that the packet is not to be sent via a shared buffer (e.g., insufficient shared buffer space exists), next it may be determined whether sufficient dedicated credits are available (diamond 370). For example, for transmission of a data packet, a dedicated buffer corresponding to a data channel may have its associated dedicated counter analyzed to determine whether it has sufficient credits. As discussed above, in some embodiments, the dedicated counter may count credits on a per-message basis. If it is determined at diamond 370 that insufficient dedicated credits are available, control may pass to block 375. There, a signal, such as an overflow or other back pressure signal may be sent to, for example, a protocol layer, to stall the protocol layer (block 375). At a later time, it may again be determined whether sufficient dedicated credits are available to send the packet (diamond 370). Alternately, the packet may be routed for transmission via a shared virtual network if shared buffer resources have become available. Accordingly, in such an embodiment, control may pass from diamond 370 to diamond 320, discussed above.

If instead at diamond 370 it is determined that sufficient dedicated credits are available, control may pass to block 380. There, the packet is sent and the dedicated counter is updated accordingly (block 380). For example, for a dedicated buffer operating on a per-packet basis, the dedicated buffer may have its dedicated counter decremented by one. The packet sent may be received by a receiving agent and processed accordingly. When the packet is properly received and stored in the receiving agent, the receiving agent may send a dedicated counter return credit. Accordingly, at block 390, the sending agent may receive the dedicated counter return credit (block 390). Based on the received return credit, the dedicated counter may be updated accordingly.

Thus all packets will try to use the shared adaptive network first. If the number of available flits in the shared adaptive network is not sufficient to transmit the packet, then the non-shared virtual network may be used for the packet transmission. While shown with this particular implementation in the embodiment of FIG. 4, in other embodiments, dedicated channels may be designated as primary channels. Still further in other implementations, a determination of channel (and buffer) type may be based upon relative available buffer space.

Figure 5:
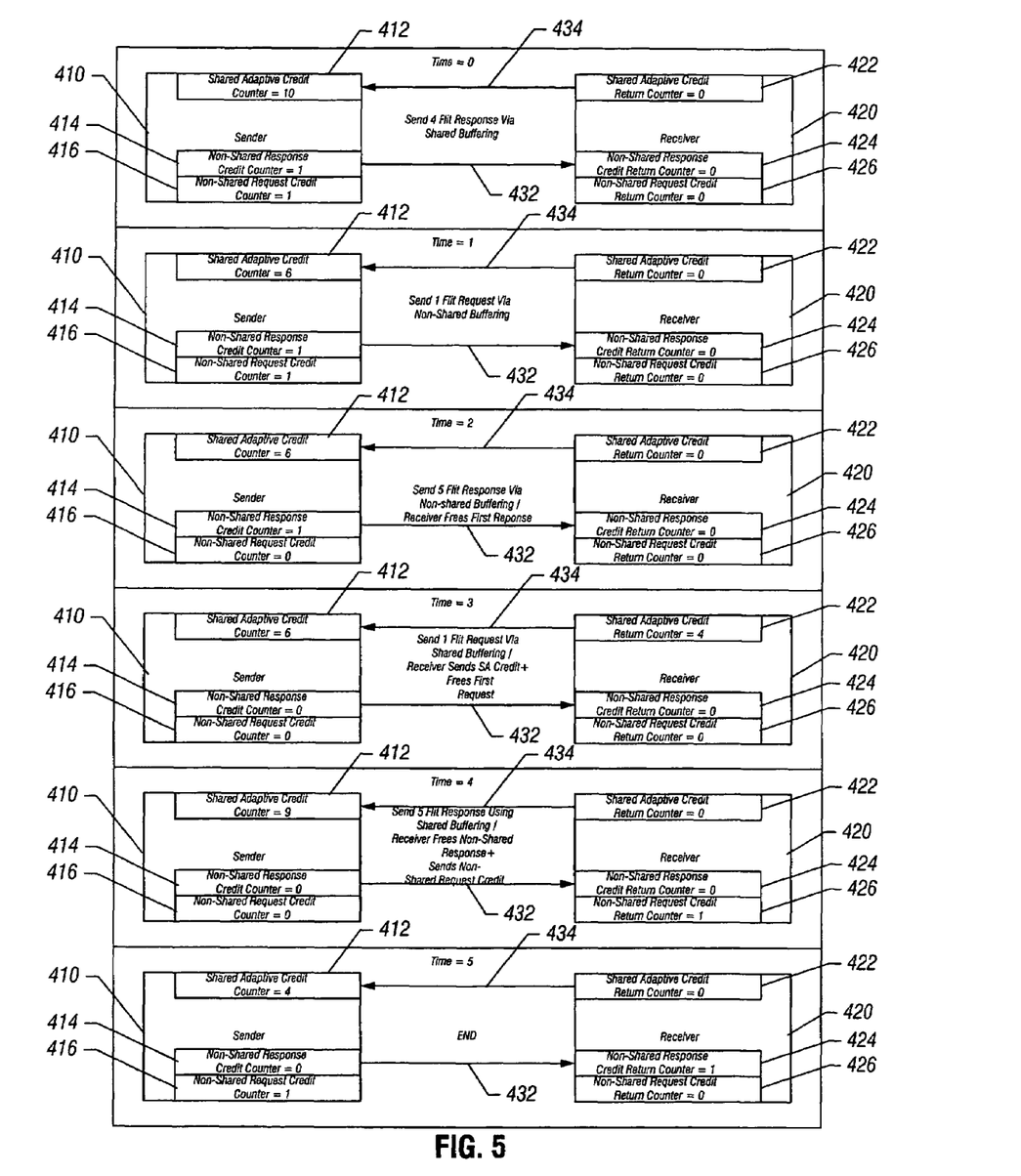
FIG. 5 is a timing diagram of message transactions occurring in accordance with an embodiment of the present invention.

Referring now to FIG. 5, shown is a timing diagram of message transactions occurring in accordance with an embodiment of the present invention. As shown in FIG. 5, a first endpoint (i.e., a sender) 410 is connected via point-to-point interconnects 432 and 434 to a second endpoint (i.e., receiver) 420. As shown in FIG. 5, sender 410 includes multiple counters for use in flow control. Specifically, sender 410 includes a shared adaptive credit counter 412, a non-shared response credit counter 414, and a non-shared request credit counter 416. Similarly, receiver 420 includes a shared adaptive credit return counter 422, a non-shared response credit return counter 424, and a non-shared request credit return counter 426. While shown with these particular counters in the embodiment of FIG. 5, it is to be understood that the scope of the present invention is not so limited, and in other embodiments different counter structures may be present. For example, the counters of sender 410 may also be present in receiver 420, and the counters of receiver 420 may also be present in sender 410. Furthermore, while not shown in FIG. 5, it is to be understood that first endpoint 410 and second endpoint 420 each include multiple buffers, including dedicated buffers and shared buffers, such as those shown in FIG. 3 discussed above.

FIG. 5 shows a view of the different counters modified by operations occurring during a time sequence of hypothetical transactions. As shown at a time zero, the counters of sender 410 have a status in which shared adaptive credit counter 412 equals ten, and non-shared response credit counter 414 and non-shared request credit counter 416 both equal one. At receiver 420, shared adaptive credit return counter 422 equals zero, as do non-shared response credit return counter 424 and non-shared request credit return counter 426.

At time zero, sender 410 sends a four-flit response using the shared buffer. Accordingly, as shown at a following time one (it is to be understood that the time periods shown at FIG. 5 are meant to show chronological order, and not necessarily bus cycles or other specific timing pattern), shared adaptive credit counter 412 of sender 410 has accordingly been decremented to a value of six to reflect the prior four-flit response that was sent. All other counters remain at their same values at time one. Also at time one, sender 410 sends a one-flit request using a non-shared buffer.

At a next time two, sender 410 sends a five-flit response using a non-shared buffer. Furthermore, at time two, receiver 420 frees the first response that was sent (i.e., the four-flit response sent at time zero). Also at time two, non-shared request credit counter 416 of sender 410 has been decremented to zero to reflect the request sent at time one. All other counters remain at their previous value.

At a next time instant (i.e., time three), non-shared response credit counter 414 of sender 410 has been decremented to zero, reflecting the response sent at time two. Furthermore, shared adaptive credit return counter 422 of receiver 420 has been updated to a value of four to reflect the freeing of the four-flit response (that occurred at time two) sent by sender 410 at time zero. Sender 410 sends a one-flit request using shared buffering at time three. Furthermore, receiver 420 sends the shared adaptive credit message and frees the first request (i.e., the one-flit request sent at time one) at time three.

Assume instead at time three, shared adaptive credit counter 412 has a value of zero and that sender 410 still desires to send a one-flit request. In this scenario, the packet is forced to be transmitted via non-shared buffering. However, note that at time three, non-shared request credit counter 416 also has a value of zero. Assuming this scenario occurs, sender 410 may send a signal back to a protocol layer, for example, to indicate the lack of resources.

Referring back now to the actual scenario shown in FIG. 5, as shown at a time four, shared adaptive credit counter 412 has been updated to a value of nine to reflect the shared adaptive credit return of four and the one flit request sent at time three. Also shown at time four, shared adaptive credit return counter 422 has been decremented to zero, and non-shared request credit return counter 426 of receiver 420 has been updated to a value of one to reflect the freeing of the non-shared request that occurred at time three. Also at time four, sender 410 sends a five-flit response using shared buffering. Furthermore, receiver 420 frees the non-shared response that occurred at time two and also receiver 420 sends the non-shared request credit.

Accordingly, as shown at time five, shared adaptive credit counter 412 has been updated to a value of four and non-shared request credit counter 416 has been updated to a value of one (and correspondingly non-shared request credit return counter 426 of receiver 420 has been updated to a value of zero). Further, non-shared response credit return counter 424 has been updated to a value of one.

While shown with this example sequence in FIG. 5, it is to be understood that additional counters and operations may be performed at various times and between different devices using embodiments of the present invention.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a buffer pool including a first buffer to be dedicated to a first virtual channel of a first virtual network, the first buffer of a multi-flit size, and a third buffer to be dedicated to a second virtual channel of the first virtual network, the third buffer of a single flit size; and
a second buffer to be shared among a plurality of virtual channels of a second virtual network, the second buffer of a multi-flit size, and wherein each of the first and second virtual channels have dedicated credits and flow control of the buffer pool is according to a packet-based flow control scheme and flow control of the second buffer is according to a flit-based flow control scheme.

2. The apparatus of claim 1, wherein the second buffer comprises a shared adaptive buffer shared among the plurality of virtual channels.

3. The apparatus of claim 1, wherein the first buffer is to be controlled on a packet basis.

4. The apparatus of claim 3, wherein the second buffer is to be controlled on a flit basis.

5. The apparatus of claim 1, further comprising a shared counter associated with the second buffer to store a value corresponding to a credit level of the second buffer, the shared counter controlled on a message size basis.

6. The apparatus of claim 5, further comprising a first response credit counter associated with the first buffer to store a value corresponding to a response credit level of the first buffer, the first response credit counter controlled on a per message basis.

7. The apparatus of claim 6, wherein the first buffer is to send a back pressure signal to stall a protocol layer if insufficient credits are available in the first response credit counter.

8. The apparatus of claim 6, further comprising a first request credit counter associated with the second buffer to store a value corresponding to a request credit level of the second buffer.

9. The apparatus of claim 1, wherein the apparatus comprises a first agent to be coupled to a second agent via a point-to-point interconnect.

10. The apparatus of claim 1, wherein the second buffer is to be a primary communication channel and the buffer pool is to be a secondary communication channel.

11. A method comprising:
buffering a first message to be sent via a first virtual channel in a first buffer of a link layer of a first endpoint, the first buffer dedicated to the first virtual channel;
buffering a second message to be sent via a second virtual channel in a second buffer of the link layer of the first endpoint, the second buffer shared by a plurality of virtual channels including the second virtual channel; and
sending the first message via the first virtual channel from the first endpoint to a second endpoint coupled to the first endpoint if a credit counter associated with the first buffer has a sufficient credit value, wherein the credit counter is controlled on a per message basis and is updated responsive to a return credit value received from the second endpoint, and otherwise sending a back pressure signal from the link layer to a protocol layer of the first endpoint.

12. The method of claim 11, further comprising sending the second message via the second virtual channel if a shared credit counter associated with the second buffer has a sufficient credit value, wherein the shared credit counter is controlled on a message size basis.

13. The method of claim 11, further comprising enabling the second buffer to be a primary buffer of a system and the first buffer to be a secondary buffer of the system.

14. The method of claim 11, further comprising:
controlling messages to be sent via the first virtual channel according to a first flow control protocol; and
controlling messages to be sent via the second virtual channel according to a second flow control protocol.

15. The method of claim 14, wherein the first flow control protocol comprises a packet-based protocol and the second flow control protocol comprises a flit-based protocol.

16. A system comprising:
a first agent having a first non-shared counter to count credits for a first non-shared buffer dedicated to a first virtual channel of a non-shared virtual network and a first shared counter to count credits for a first shared buffer to be shared by a first plurality of virtual channels of a shared adaptive virtual network, wherein the first non-shared counter is to count credits according to a first flow control scheme and the first shared counter is to count credits according to a second flow control scheme and the first shared buffer is to be used over the first non-shared buffer if sufficient credits are available in the first shared counter to transmit a packet;
a second agent coupled to the first agent, the second agent having a second non-shared counter to count credits for a second non-shared buffer dedicated to a second virtual channel and a second shared counter to count credits for a second shared buffer to be shared by a second plurality of virtual channels, wherein the second agent is to send a shared counter return credit upon receipt of a packet from the first shared buffer and the first shared counter is to update the credits for the first shared buffer in accordance with the shared counter return credit; and
a dynamic random access memory (DRAM) coupled to the first agent and the second agent.

17. The system of claim 16, wherein the first non-shared counter is to count credits on a message basis and the first shared counter is to count credits on a flit basis.

18. The system of claim 16, further comprising a serial interconnect to couple the first agent and the second agent.

19. The system of claim 16, wherein the first non-shared counter includes a response counter and a request counter.

* * * * *